Feb. 18, 1936. G. N. KNOX 2,031,537
SPRING AXLE
Filed June 13, 1934 2 Sheets-Sheet 1
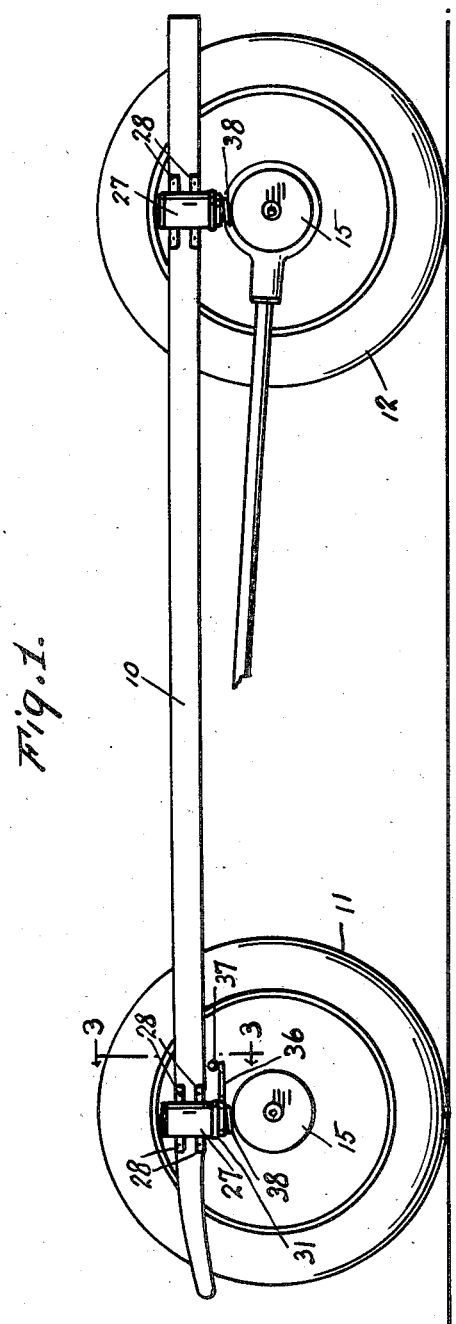
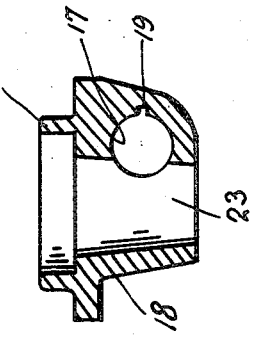
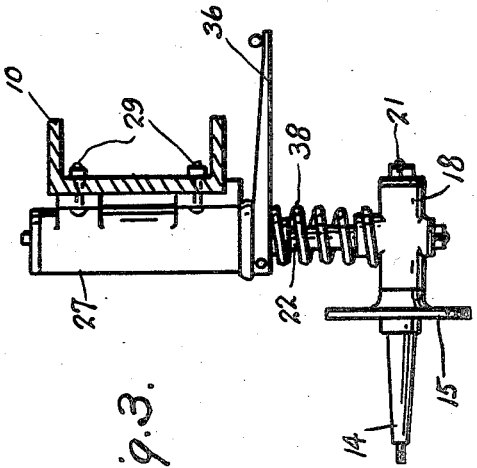
Inventor
G. N. Knox
By Clarence A. O'Brien
Attorney Feb. 18, 1936.  G. N. KNOX  2,031,537
SPRING AXLE
Filed June 13, 1934  2 Sheets-Sheet 2
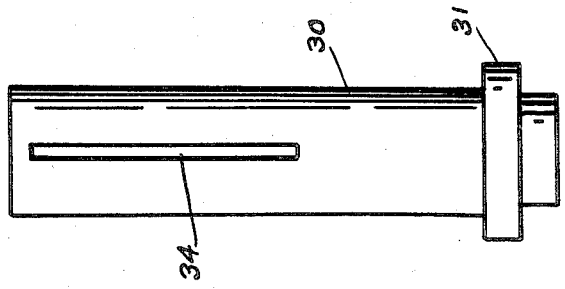
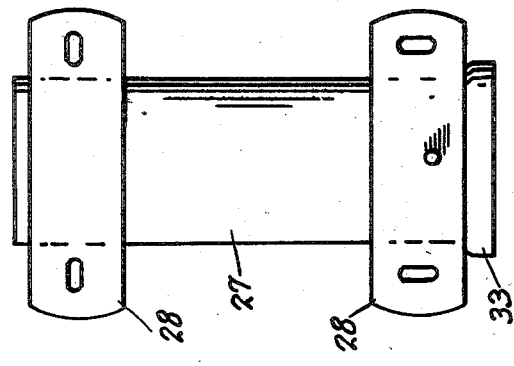
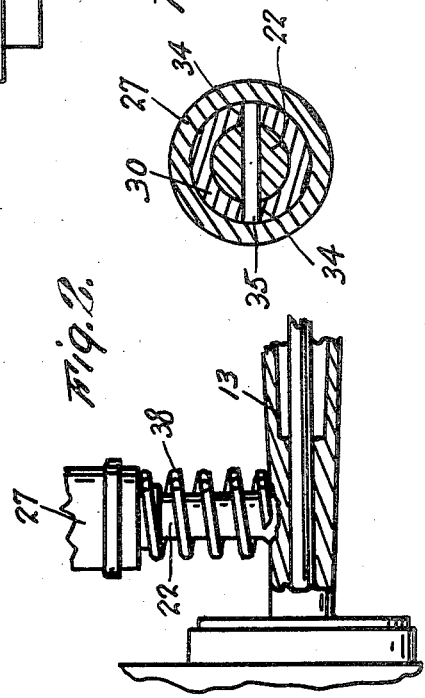
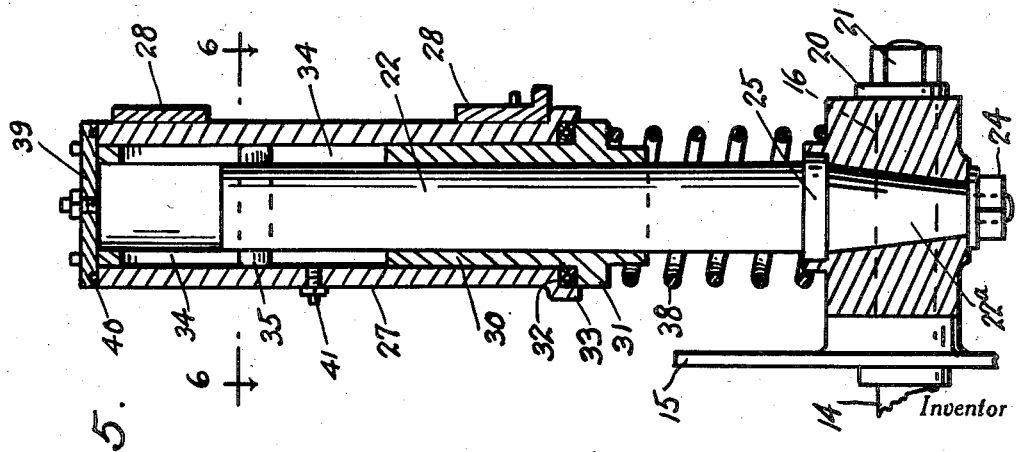
Inventor
G. N. Knox
By Clarence A. O'Brien
Attorney Patented Feb. 18, 1936

2,031,537

UNITED STATES PATENT OFFICE 2,031,537

SPRING AXLE

George N. Knox, Alliance, Ohio

Application June 13, 1934, Serial No. 730,523

2 Claims. (Cl. 267—60)

This invention relates to spring axles and has for its prime object the provision of such a device particularly adapted for automobiles to permit the wheels to rise or fall with respect to the frame of the vehicle, vertically, and under a yielding resistance.

The invention together with its objects and advantages will be best understood from a study of the following description taken in connection with the accompanying drawings wherein:

Figure 1 is an elevational view with the near wheels removed.

Figure 2 is a fragmentary view partly in section and partly in elevation illustrating the invention as applicable to the rear wheel of an automobile.

Figure 3 is a detailed sectional view taken substantially on the line 3—3 of Figure 1.

Figure 4 is a sectional view through an axle housing.

Figure 5 is an enlarged sectional view through a spring axle for the front wheel of an automobile.

Figure 6 is a sectional view taken substantially on the line 6—6 of Figure 5.

Figure 7 is an elevational view of the cylinder or housing forming part of the invention.

Figure 8 is an elevational view of a lining sleeve for the cylinder shown in Figure 7.

Referring to the drawings by reference numerals it will be seen that the chassis bars are indicated by the reference numeral 10 while the front wheels are indicated by the reference numerals 11, the rear wheels by the reference numerals 12, and the rear axle housing by the reference numeral 13.

In accordance with the present invention there is provided for each front wheel of the vehicle a spring axle comprising a spindle 14 having a flange 15 and a stub axle part 16. The stub axle part 16 fits within the bore 17 of an axle housing 18, the bore 17 being provided with a suitable way 19 for accommodating a key on the stub axle 16. On the free end thereof there is provided a suitable washer 20 and nut 21 cooperating with the flange 15 to secure the axle against endwise movement.

As is apparent the vehicle wheel 11 is suitably mounted on the spindle 14.

A pivot pin 22 has a tapered end 22a that is secured within a vertical tapered opening 23 of the axle housing 18. The end 22a is secured within the aperture 23 of the housing 18 through the medium of washer and nut means 24 on the free end of the tapered part 22a, and a collar 25 resting on the top wall of the housing 18 within the confines of a flange 26.

A housing 27 is provided on one side with upper and lower brackets 28 through the medium of which, and suitable fastening means 29, the housing is secured laterally to the chassis bar 10 as clearly suggested in Figures 1 and 3. For the housing or cylinder 27 there is provided a pivot sleeve 30 which adjacent its lower outer end is provided with a shoulder 31 between which and an internal shoulder 32 provided at the lower end of the housing 27 is confined a suitable bearing 33.

The inner end portion of the sleeve 30 is provided with diametrically disposed slots 34 in which operate the ends of a key 35 that extends transversely through the pivot rod 22 adjacent the inner or upper end thereof.

Below the shoulders 31 thereof the sleeves 30 are provided with steering arms 36, the arms being coupled by means of a rod 37, and any suitable means may be provided whereby the wheels may be turned by the steering mechanism in the usual manner.

The sleeve 30 is resiliently retained inwardly of the housing 27, and the axle housing 18 yieldably retained in vertically spaced relation to the lower end of the sleeve 30 through the medium of the spring 38 which is disposed about the pivot rod 22 and has its upper convolutes disposed about the lower end of the sleeve 22 and bearing against the shoulder 31, and its lower convolutes disposed about the flange 26 and bearing against the top of the axle housing all of which is clearly shown in Figure 5.

For the top of the housing 27 there is provided a suitable closure 39 between which and the wall of the housing 27 there is disposed a packing 40. The housing 27 is also provided with a suitable alemite fitting 41.

In actual practice it will be apparent that when a wheel 11 rolls into a depression suddenly the spring 28 will expand so as to prevent the housing 27 and sleeve 30 from moving downwardly suddenly, and again as the wheel rides from out of the depression or runs over a stone or any other obstruction, the spring 38 becomes compressed permitting the housing 18 to move upwardly relative to the housing 27 and the frame, thus serving to prevent any sudden jar or abrupt stop of the frame and axle.

It will be evident from the foregoing that the frame and the axle are thus movable vertically relative to each other and that the cushioning means will not materially affect any steering action of the wheels.

In Figure 2 wherein is illustrated the application of the invention to the rear wheels of the vehicle it will be noted that the pivot rod 22' is secured directly to the rear axle housing 13 in any suitable manner preferably by being integral therewith and that the lower end of the spring 38' bears directly upon the housing 13. Thus the housing 13 will be suspended from the frame of the vehicle to permit relative vertical movement between the frame and the rear wheels of the vehicle.

Having thus described the invention, what I claim as new is:

1. A spring axle including a cylindrical housing adapted to be mounted on the frame of an automobile, a sleeve rotatably mounted in the housing and provided with longitudinal slots, an axle housing, a pivot rod movable longitudinally in the sleeve and connected at one end with the axle housing, a key on the inner end of the rod engaging in the slots of the sleeve, and a spring disposed about the pivot rod and having an end bearing against one end of the sleeve, and a second end bearing against the axle housing.

2. A spring axle including a cylindrical housing adapted to be mounted on the frame of an automobile, a sleeve rotatably mounted in the housing and provided with opposed longitudinal slots, an axle housing, a pivot rod movable longitudinally in the sleeve and connected at one end with the axle housing, a key extending transversely through the inner end of the rod and engaging in the slots of the sleeve, and a spring disposed about the pivot rod and having an end bearing against one end of the sleeve, and a second end bearing against the stub axle housing, and a steering arm secured to the sleeve, a shoulder on the sleeve, an internal shoulder at the lower end of the housing, and a bearing confined between said shoulders and within the lower end of said housing.

GEORGE N. KNOX.